United States Patent [19]
Smith

[11] Patent Number: 5,189,553
[45] Date of Patent: Feb. 23, 1993

[54] OPTIMIZED CONSTRUCTION OF RETROREFLECTIVE ARTICLES FOR CURVED APPLICATIONS

[75] Inventor: Kenneth L. Smith, White Bear Lake, Minn.

[73] Assignee: Minnesota Mining and Manufacturing Company, St. Paul, Minn.

[21] Appl. No.: 895,275

[22] Filed: Jun. 8, 1992

[51] Int. Cl.$^5$ .............................................. G02B 5/124
[52] U.S. Cl. ..................................... 359/530; 156/230
[58] Field of Search ............... 359/515, 529, 530, 534, 359/535–540, 542, 546; 156/230; 404/16

[56] References Cited

U.S. PATENT DOCUMENTS

| | | | |
|---|---|---|---|
| 2,310,790 | 2/1943 | Jungersen | 88/105 |
| 2,380,447 | 7/1945 | Jungersen | 88/78 |
| 2,481,757 | 9/1949 | Jungersen | 88/78 |
| 3,332,327 | 7/1967 | Heenan | 94/1.5 |
| 3,469,898 | 9/1969 | Altman | 350/103 |
| 3,684,348 | 8/1972 | Rowland | 359/530 |
| 3,712,706 | 1/1973 | Stamm | 350/103 |
| 3,744,117 | 7/1973 | Heenan et al. | 29/416 |
| 3,810,804 | 5/1974 | Rowland | 359/530 |
| 3,830,682 | 8/1974 | Rowland | 161/2 |
| 3,922,065 | 11/1975 | Schultz | 359/530 |
| 3,924,929 | 12/1975 | Holmen et al. | 359/530 |
| 3,935,359 | 1/1976 | Rowland | 428/172 |
| 3,984,175 | 10/1976 | Suhr et al. | 359/530 |
| 3,992,080 | 11/1976 | Rowland | 359/530 |
| 4,127,693 | 11/1978 | Lemelson | 428/163 |
| 4,182,548 | 1/1979 | Searight et al. | 359/530 |
| 4,279,471 | 7/1981 | Rowland | 359/530 |
| 4,486,363 | 12/1984 | Pricone et al. | 264/1.4 |
| 4,555,161 | 11/1985 | Rowland | 359/530 |
| 4,588,258 | 5/1986 | Hoopman | 359/530 |
| 4,601,861 | 7/1986 | Pricone et al. | 264/1.6 |
| 4,612,473 | 9/1986 | Nilssen | 313/111 |
| 4,618,518 | 10/1986 | Pricone et al. | 428/40 |
| 4,648,689 | 3/1987 | May | 359/538 |
| 4,672,089 | 6/1987 | Pricone et al. | 524/354 |
| 4,801,193 | 1/1989 | Martin | 359/530 |
| 4,938,563 | 7/1990 | Nelson et al. | 359/530 |
| 5,117,304 | 5/1992 | Huang et al. | 359/529 |

OTHER PUBLICATIONS

Timoshenko, S. P. et al., *Theory of Elasticity*, McGraw Hill, New York, 3rd Edition, pp. 284–288 (1970).

*Primary Examiner*—Bruce Y. Arnold
*Assistant Examiner*—James Phan
*Attorney, Agent, or Firm*—Gary L. Griswold; Carolyn A. Bates; Peter Forrest

[57] ABSTRACT

Retroreflective cube corner elements are arranged within layered articles at positions proximate a neutral axis to optimize their performance upon bending or twisting of the article. The elements and surfacs may be embodied in flexible sheeting materials suitable for curving about an object.

20 Claims, 14 Drawing Sheets

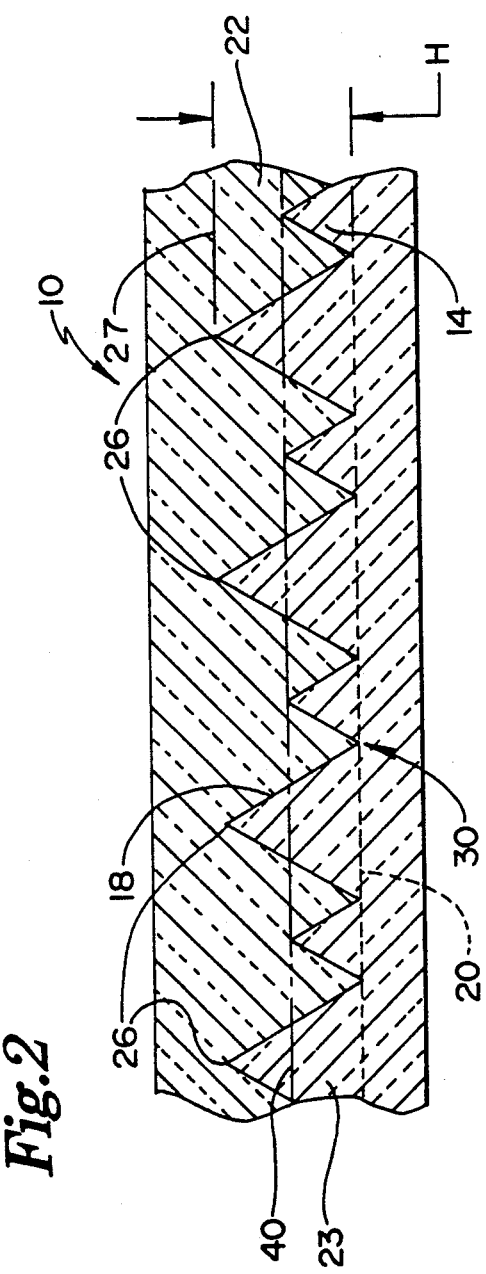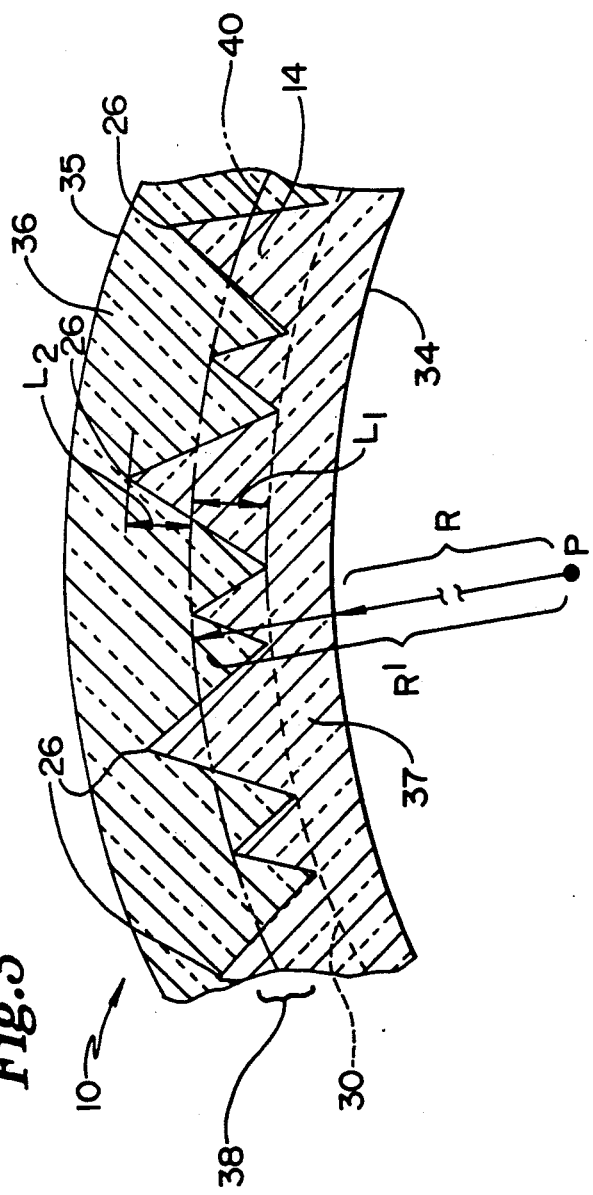

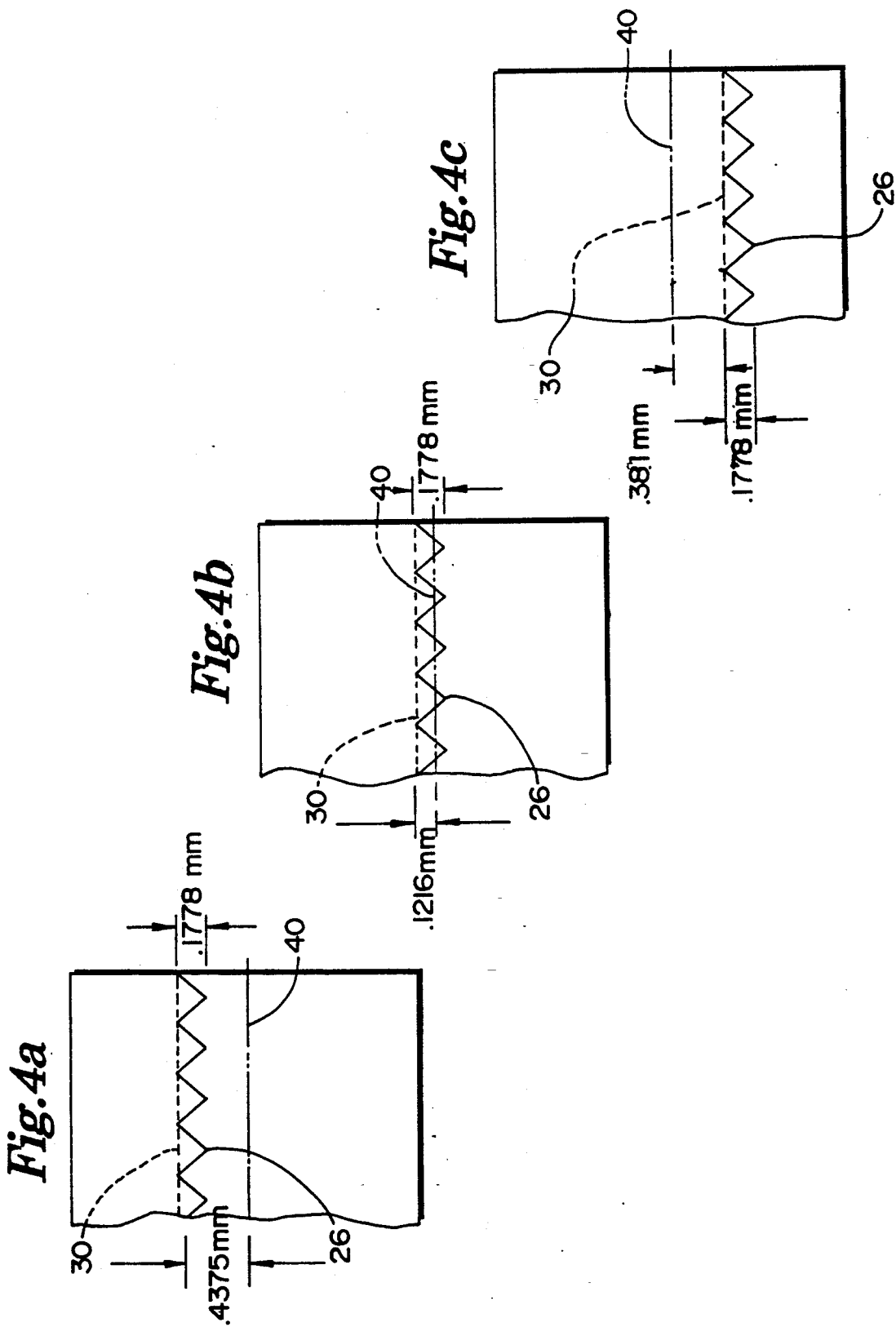

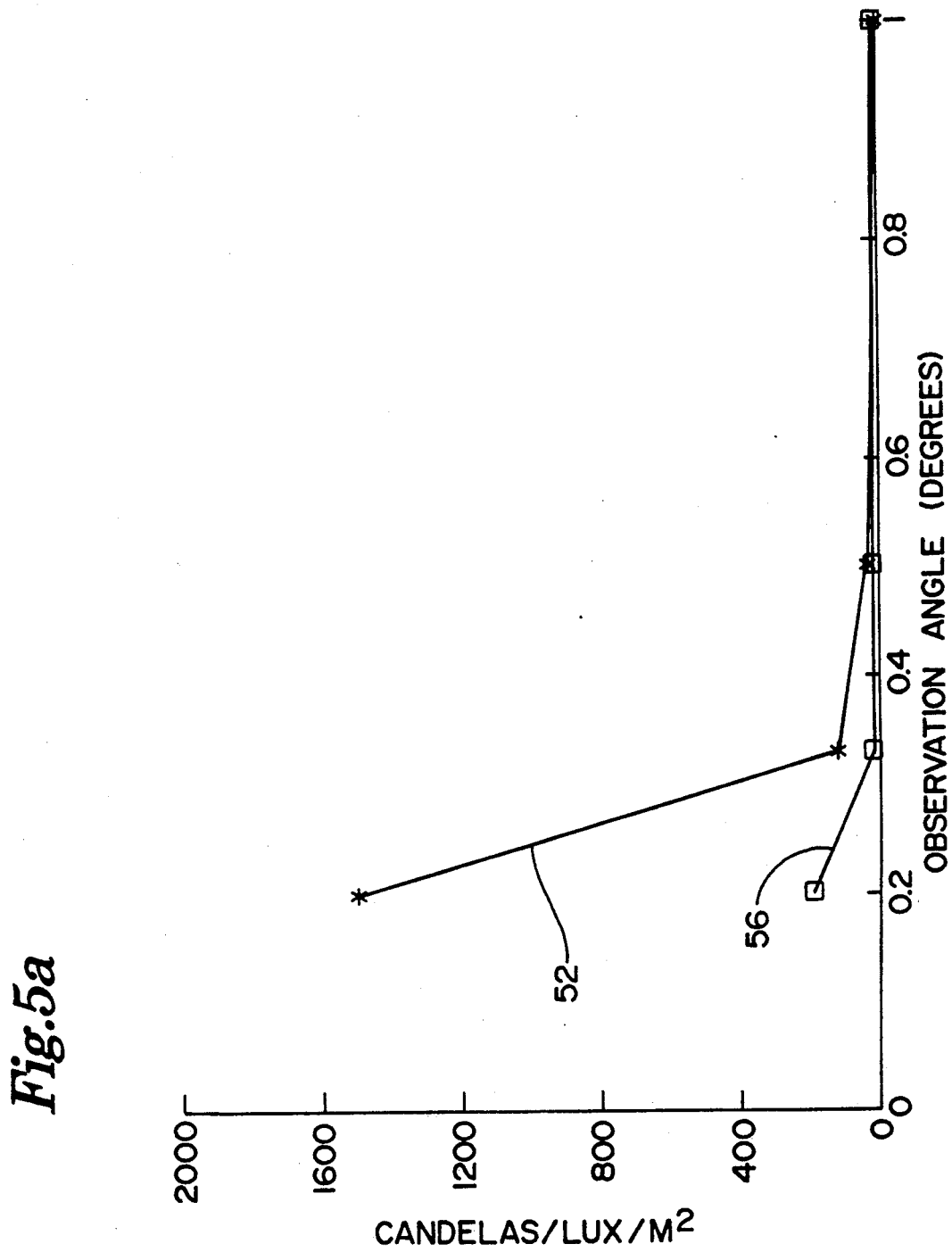

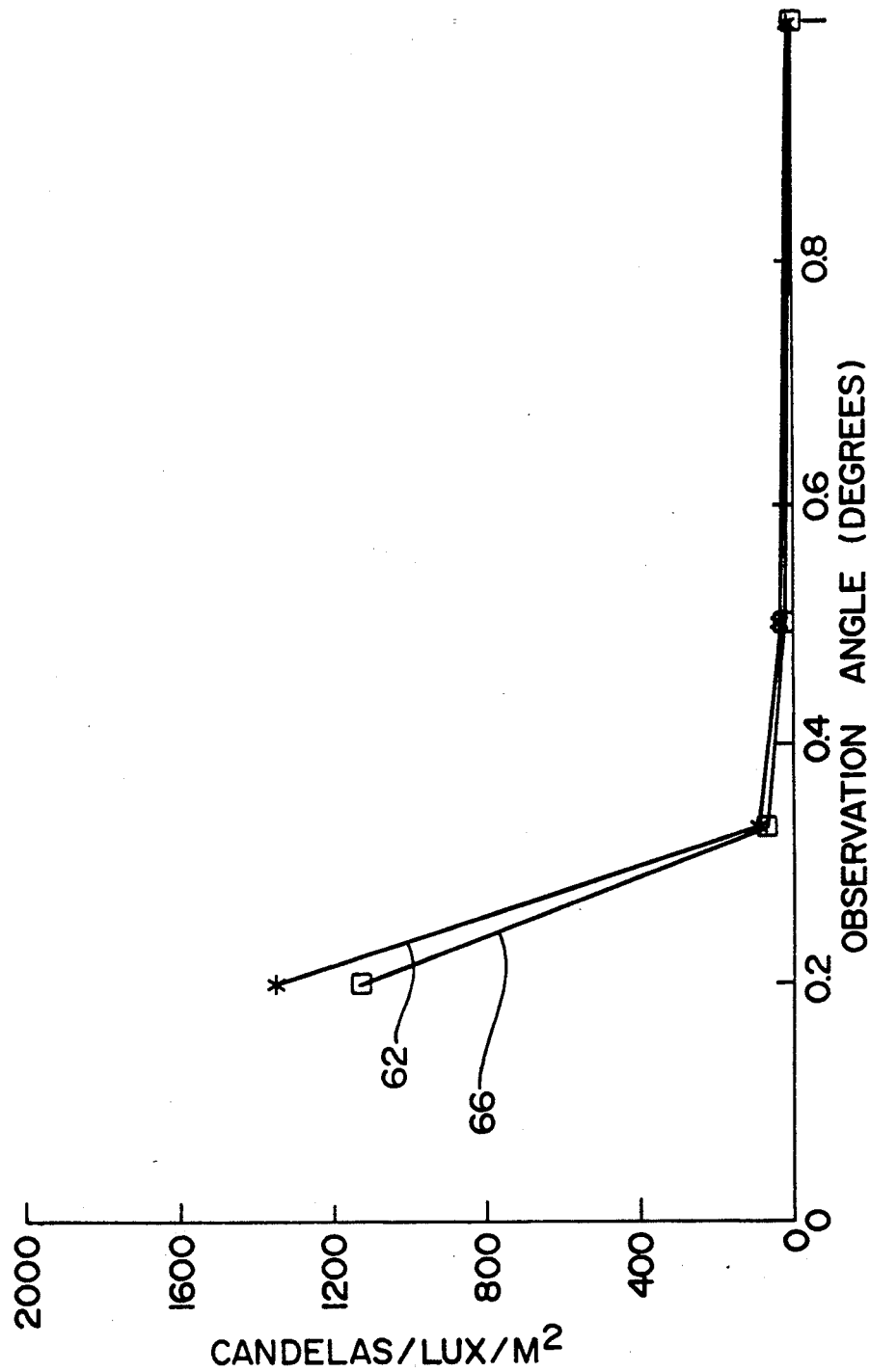

OPTIMIZED CONSTRUCTION OF RETROREFLECTIVE ARTICLES FOR CURVED APPLICATIONS

FIELD OF THE INVENTION

This invention relates to retroreflective articles designed for applications in which the articles themselves are curved, or are applied to a curved substrate. More particularly, the retroreflective articles comprise reflective cubes located proximate the neutral axis of the articles.

BACKGROUND OF THE INVENTION

Many types of retroreflective elements utilize either glass beads or cube corners as the retroreflective optical element. Generally, when these retroreflective elements are assembled into articles or sheeting, the resulting product is nearly flat (in the case of inflexible articles such as automobile taillights) or designed to be applied to a flat substrate (such as a flexible sheeting applied to a metallic substrate, e.g., a traffic sign).

Many applications, however, require curved retroreflective elements fabricated from retroreflective sheeting. For example, retroreflective posts, cones, and barrels require that the sheeting bend to conform to a curved substrate. Another example is truck trailers with corrugations or rivets on the sides. Retroreflective sheeting must undergo substantial bending to conform to such surfaces. Retroreflective sheeting for such applications often utilize glass beads as the optical element. These beads are generally much higher in modulus than the polymers used in the carrier film (100 times or more). Therefore, very little deformation of the beads occurs during bending, and optical performance is not degraded.

Retroreflective sheeting using cube corners as the optical elements is also utilized in curved applications because of higher retroreflective efficiency. If such sheeting is made sufficiently thin, it will conform during applications requiring significant bending, as shown in Rowland U.S. Pat. Nos. 3,684,348, 3,935,359; Martin U.S. Pat. No. 4,801,193; and Pricone U.S. Pat. No. 4,672,089. However, the cubes in curved sheeting constructions are generally at or near the surface of the sheeting and tend to undergo significant optically degrading deformation. This occurs because the cubes are made from materials similar in modulus to the rest of the sheeting.

Other literature, such as Lemelson U.S. Pat. No. 4,127,693, describes cube corner constructions where the cubes are formed at the interface between two polymeric materials. However, during bending such cubes may still undergo significant deformation even though they are not located at the outer surface of the sheeting. Such deformation distorts the cubes and degrades optical performance.

SUMMARY OF THE INVENTION

The invention is a retroreflective cube corner element laminated sheet that is suitable for bending applications. The sheet has an outer surface which is designed for tension during sheet bending and an inner surface designed for compression during sheet bending. A sheet neutral bending axis region is located relative to the outer and inner surfaces so that a neutral bending axis exists which is substantially free of stress and deformation during sheet bending. The sheet also has a plurality of reflective cube corner elements with surfaces purposefully located proximate the neutral bending axis. This provides enhanced retroreflective performance for a given radius of curvature.

A layered cube corner element article is also disclosed which has the outer and inner surfaces and the neutral bending axis region as described above. However, this article has reflective cube corner elements positioned between the outer surface and the inner surface, with the cubes having surfaces purposefully located proximate the neutral bending axis. The placement of the cube surfaces proximate the neutral bending axis is to reduce strain energy density on the reflective cubes thereby enhancing the optical performance of the article.

A method of manufacturing a retroreflective cube corner element laminated sheet for bending applications is also described. A first manufacturing step is to provide a sheet outer surface designed for tension during laminated sheet bending and a sheet inner surface designed for compression during laminated sheet bending. Another step is to position reflective cubes, with each cube having a base and a peak. The cubes are positioned intentionally proximate the neutral bending axis of the sheet to create optimal retroreflective performance for a given radius of curvature.

BRIEF DESCRIPTION OF THE DRAWING

FIG. 2 is a simplified schematic cross sectional view of the article of the invention taken along lines 2—2 of FIG. 1.

FIG. 3 is a cross sectional view of the article depicted in FIG. 2, after bending about an axis perpendicular to the plane of FIG. 2.

FIG. 4a is a simplified schematic sectional view of 0.1778 mm height retroreflective cubes located with a base 0.4375 mm above the neutral axis, with base and peak reversed relative to FIGS. 2 and 3.

FIG. 4b is a simplified schematic sectional view of 0.1778 mm height retroreflective cubes located at the neutral axis with a base 0.1216 mm above the neutral axis, with base and peak reversed relative to FIGS. 2 and 3.

FIG. 4c is a simplified schematic sectional view of 0.1778 mm height retroreflective cubes located with a base 0.381 mm below the neutral axis, with base and peak reversed relative to FIGS. 2 and 3.

FIG. 5a is a plot of the divergence profile of the cube of FIG. 4a.

FIG. 5b is a plot of the divergence profile of the cube of FIG. 4b.

FIG. 6a is an optical path difference plot for the cube of FIG. 4a.

DETAILED DESCRIPTION OF THE INVENTION

The invention is a retroreflective cube corner element laminate sheet suitable for bending applications. The sheet comprises prismatic retroreflective elements located within the article proximate the article's neutral bending axis to optimize the retroreflective performance of the article. Many types of prismatic elements may be used, and specularly reflective coatings on the elements are preferred. The invention, in one embodiment, comprises a flexible polymeric sheet having an array of prismatic retroreflective elements on one side. The sheet may be curved or twisted into a configuration which takes advantage of the optimized locations of the prismatic elements.

In particular, the invention is a retroreflective article constructed with one or more reflective or prismatic elements, such as reflective cubes, with surfaces located at or near the neutral bending axis of the article. Location of the reflective element at or near the neutral bending axis reduces deformation of the reflective elements and enhances the optical performance of the article. Strain energy density may be utilized to quantify the extent of deformation of the reflective elements.

Figure 1:
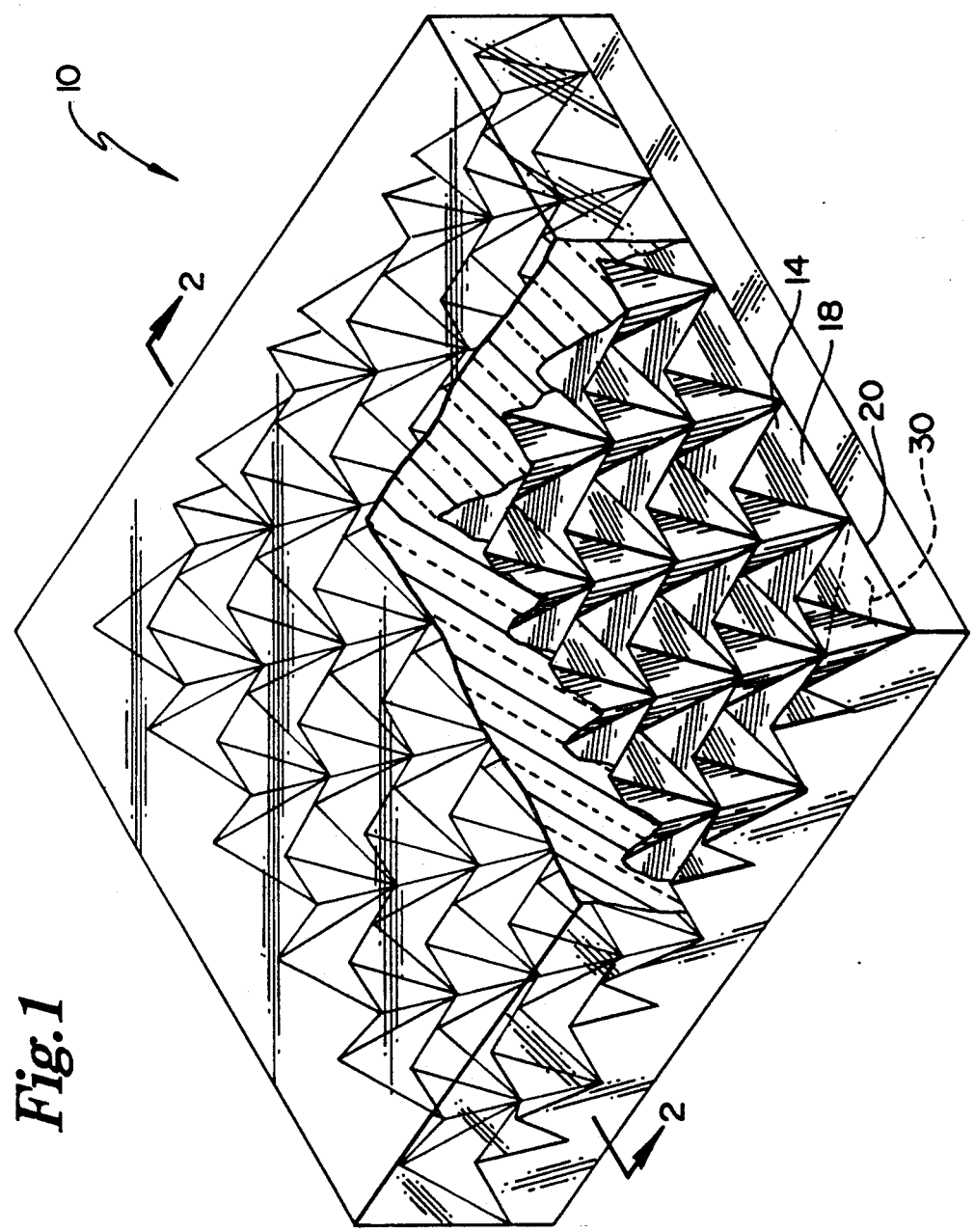
FIG. 1 is a top perspective view of a retroreflective article according to the present invention.

FIG. 1 and FIG. 2 are perspective and cross sectional views, respectively, of layered retroreflective article 10. Article 10 has several prismatic or cube corner elements 14 formed in the article according to techniques known in the art, for example by standard grooving techniques, using mold cutting tools, or electroformed molds, or other means. Each prismatic element has three triangular lateral faces 18, and each lateral face has a base edge 20. The base of an element is the area enclosed by the three base edges 20, i.e., a triangle. As shown, the bases of cube corner elements 14 are equilateral triangles, as taught in U.S. Pat. No. 3,712,706 (Stamm), but this is exemplary only. Such an element is also known as a "60-60-60" element in reference to the included angles of the base. The invention also comprises other reflective cube corner element geometries, with appropriate alternate methods of manufacture.

Article 10 preferably comprises two layers 22 and 23 having substantially different indices of refraction. The difference in refractive index between the two layers results in total internal reflection of light within cube corner elements 14. However, to simplify construction, as well as to improve optical performance, faces 18 of the retroreflective cube corner elements 14 are specularly reflective. This is typically achieved by applying an appropriate thin film coating such as aluminum, silver, or similarly reflective material. Accordingly, use of the words reflective and retroreflective are used substantially interchangeably throughout the description of this invention.

The corner or peak of each of the prismatic elements 14 is known as a cube peak 26. In FIG. 2, the surface 27 containing the cube peak 26 of each of the prismatic elements is in a plane perpendicular to the plane of the Figure. Similarly, the surface containing the base of each of the prismatic elements is known as base surface 30, and is also in a plane perpendicular to the plane of FIG. 2. The distance between cube peak surface 27 and base surface 30 is the cube height H.

FIG. 3 is a cross sectional view of the retroreflective article 10 of FIG. 2 after bending uniformly about an axis passing perpendicularly through the plane of FIG. 2 at center of curvature P. The inner radius of curvature of article 10, denoted R, is the distance between point P and a designated inner surface 34 of the article. In FIG. 3, the thickness of article 10 is shown greatly exaggerated relative to R.

When a sheet such as that represented by article 10 is deformed, portions of the sheet are subject to tensile forces, and other portions of the sheet are subject to compressive forces. For example, in the article being bent in FIG. 3, the outer large radius surface 35 and adjacent outer portion 36 of the sheet is placed in tension and the inner small radius surface 34 and adjacent inner portion 37 of the sheet is placed in compression. Article 10 is functional independent of the direction of bending. Surface 35 and surface 34 are each designed, for example, to experience tension and/or compression.

No significant torsional forces are depicted in the example of FIG. 3 because the bending is within the plane of the Figure. When the sheet or article is sufficiently thin, a neutral bending axis region 38 in the interior of the sheet has nearly negligible deformation forces acting on the sheet within that region. Region 38 contains those points at which essentially no net force is present, and the locus of those points is defined as the neutral bending axis 40 of article 10. Prismatic elements 14 are preferably located within region 38 where substantially no deformation exists despite the bending about point P. This minimizes the deformation of faces 18 of the prismatic elements during bending, which optimizes the retroreflective performance of article 10 for a given radius of curvature R.

In the embodiment of FIGS. 2 and 3, neutral bending axis 40 is depicted between cube peak 26 and base surface 30. The distance from neutral bending axis 40 to base surface 30 is defined as $L_1$ and the distance to cube peak 26 as $L_2$, with $L_1 + L_2 = H$, defining the cube or prismatic element 14 height. It is understood that either $L_1$ or $L_2$ may be a negative number when the neutral bending axis lies outside of the region between cube base surface 30 and cube peak 26.

Although FIG. 3 shows a constant radius of curvature R, producing an inner surface 34 which is an arc of a circle, the invention is not so limited. In general, the invention includes embodiments having a continuously varying radius of curvature. Furthermore, the invention does not require an article bent only in a single plane, i.e., about only one axis. Articles bent in any manner are within the scope of the invention if a plane exists so that prismatic elements and neutral axis are located with respect to each other in that plane as described in this invention.

The relationship between the neutral axis and the optical performance of a retroreflective sheet is shown by examining an isotropic cube corner sheet, i.e., assuming uniform and identical elastic properties for materials in layers 22 and 23. As noted above, for articles having a thickness much less than R, there is little error introduced in measuring R to the inner surface of the article. Also, in practical use, this definition of R is useful because it is the outer radius of the substrate to which the inventive article is applied, and is easily found. However, in the following description, R' is defined as the distance from center of curvature P to the location of the neutral bending axis.

The strain energy density, U, represents the stored energy within a prismatic element resulting from a given deformation. Deformations which degrade optical performance of a sheet increase the strain energy within the elements. Strain energy density can be calculated in closed form from the stress and strain solutions for an isotropic sheet under bending. It is a function of element design, element position relative to the neutral axis, and the bending radius of curvature of the sheet. Therefore, when appropriately utilized according to the teachings of this invention, strain energy density is a suitable parameter indicating the optical performance of a retroreflective laminate sheet experiencing deformation.

The strain energy for a given volume of material is one-half the integral of the product of the stress and strain over that volume. The strain energy density is the quotient of the strain energy and the volume. The normalized strain energy density (NSED), U'', is the quotient of strain energy density and the modulus of elasticity of the material.

Thus, as shown in FIG. 1, the normalized strain energy density is a dimensionless quantity, and is expressed for a truncated cube corner prismatic element in an isotropic sheet as a function of two other dimensionless ratios, $K_1$ and $K_2$:

$$U'' = \frac{(10K_1^2 - 5K_1 + 1)}{20K_2^2}$$

wherein
$K_1 = L_1/H$
$K_2 = R/H$
$H = L_1 + L_2$.

For a given bending radius R', the minimum strain energy density occurs when $K_1 = 0.25$ or $L_1 = H/4$, therefore $$U''_{min} = \frac{3}{160K_2^2}$$

Note that the cube is centered on the neutral axis ($L_1 = L_2 = H/2$) when $K_1$ equals 0.5. Therefore, the minimum normalized strain energy density occurs when base surface 30 is closer to neutral bending axis 40 than when cube peak 26 is closer to neutral bending axis 40.

The relationship between normalized strain energy density and cube location is closely related to optical performance, with such interdependence confirmed by actual sample measurements. The sample cube measurements described below are based on the constructions and locations shown in FIGS. 4a-4c. In these Figures, cubes having a cube height, of 0.1778 mm (7 mils) are depicted above the neutral bending axis, at the neutral bending axis, and below the neutral bending axis to provide simplified clarification of the cube-axis relationship that is helpful to an understanding of this invention.

Figure 5C:
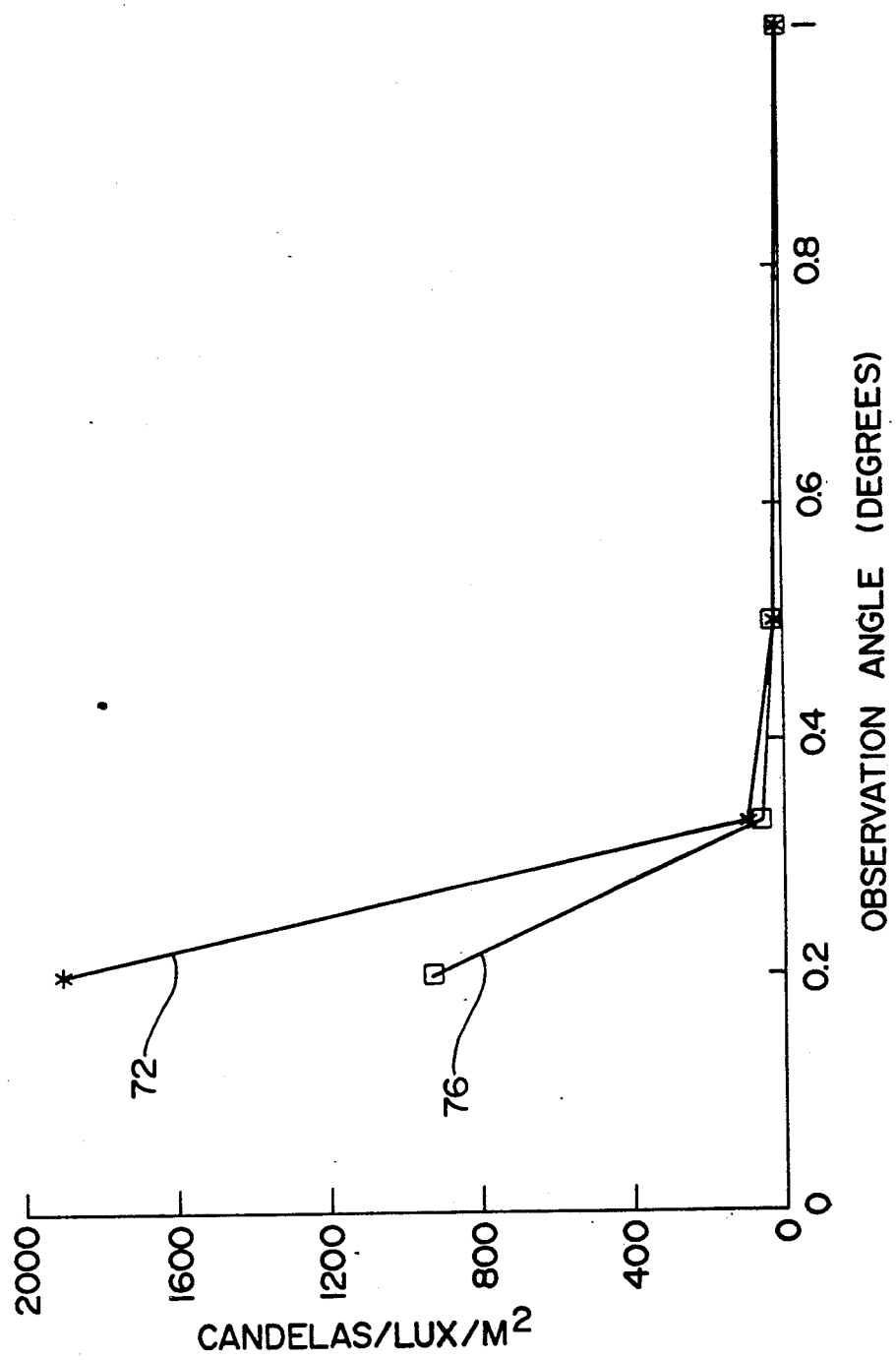
FIG. 5c is a plot of the divergence profile of the cube of FIG. 4c.

FIGS. 5a-5c disclose measured divergence profiles for the above cube configurations both before and after bending to a 63.5 millimeter (2.5 inch) bending radius. In FIG. 5a, the CPL values of profile 52 are the initial values for a cube base located 0.4375 millimeters (17.5 mils) above the neutral bending axis. In the same Figure, the CPL values of profile 56 are the values after curvature of the retroreflective article with the radius of curvature of 63.5 millimeters. FIG. 5b discloses the CPL values of profile 62 for a cube located at the neutral bending axis. Profile 62 is the initial profile for a cube 0.1216 millimeters (4 mils) above the neutral bending axis. The CPL values of profile 66 are the values after curvature. The relatively small divergence between the CPL values in FIG. 5b illustrates the excellent optical performance of sheets under bending with cubes positioned at or near the neutral bending axis. In FIG. 5c, the CPL values of profile 72 are the initial values for a cube base located 0.381 millimeters (15 mils) below the neutral bending axis. Profile 76 show CPL values for the same cube location, but after bending.

Figure 6A:
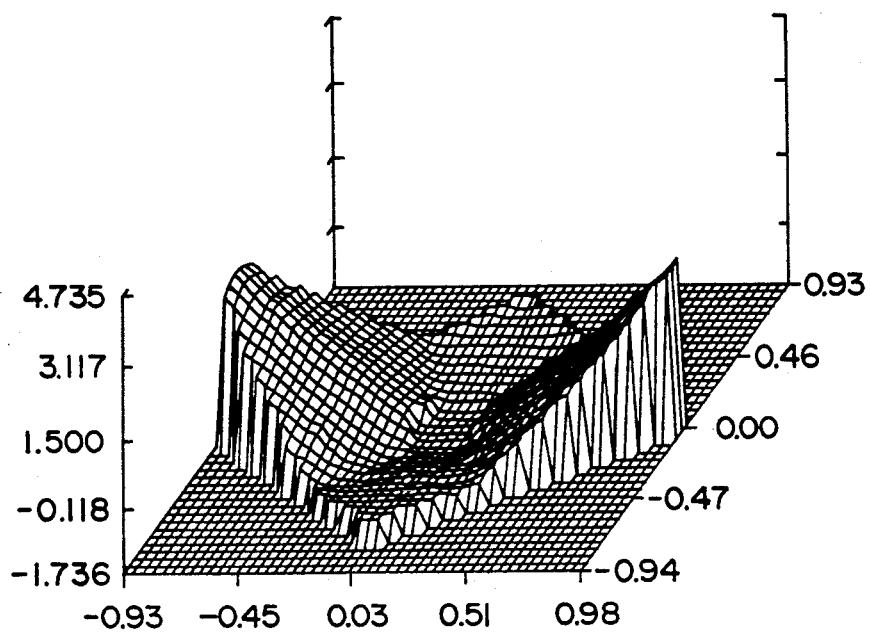
Figure 6B:
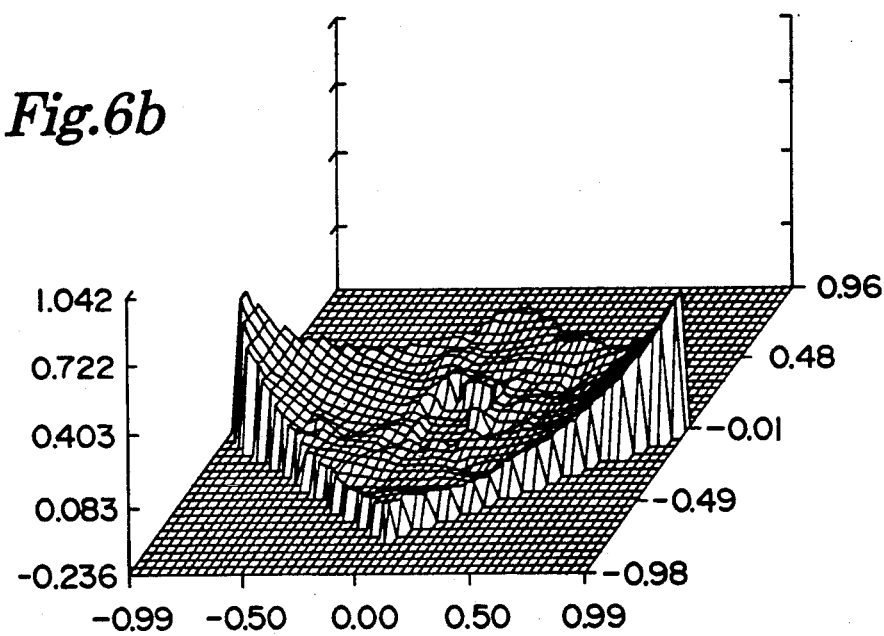
FIG. 6b is an optical path difference plot for the cube of FIG. 4b.
Figure 6C:
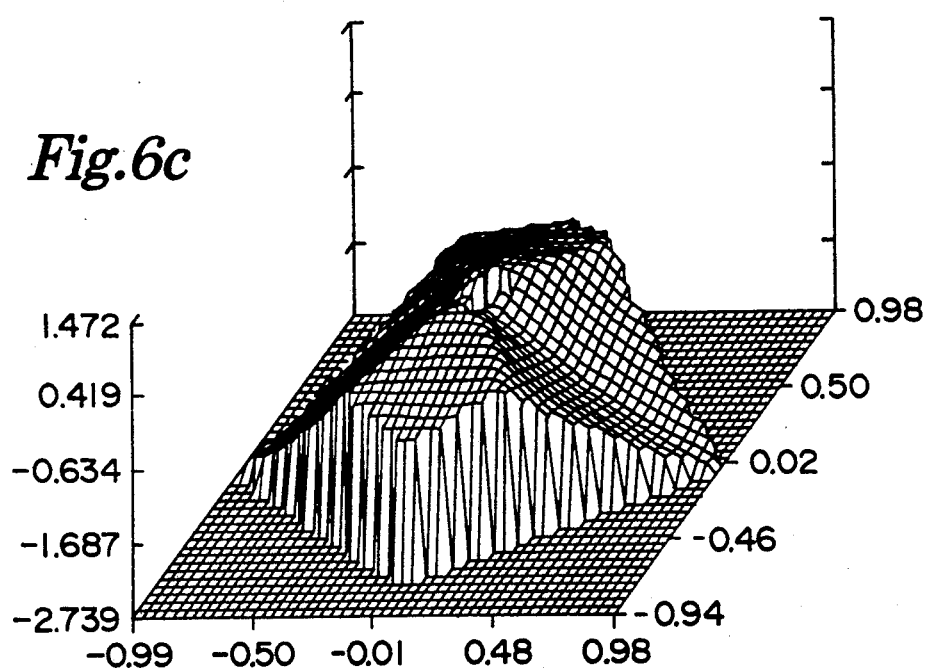
FIG. 6c is an optical path difference plot for the cube of FIG. 4c.

Optical path difference (OPD) provides another means of characterizing the optical performance of cube corner elements. A deformed cube corner element will distort the shape of an initially planar wave as it is reflected. When appropriately utilized according to the teachings of this invention, OPD is a helpful method of quantifying this distortion either experimentally or theoretically. FIGS. 6a-6c comprise plots of OPD measurements for the representative cube constructions and locations discussed above, at wavelengths of 633 nm. Specifically, FIGS. 6a, 6b, and 6c show peak to valley optical path differences of 6.472, 1.278, and 4.211, respectively.

FIGS. 6a and 6c illustrate peak to valley optical path difference values approximately equal to or greater than five waves. These constructions illustrate significant degradation in brightness, particularly when correlated with the CPL brightness values in FIGS. 5a and 5c. Conversely, the peak to valley OPD in FIG. 6b is representative of the values at about one or less wave. This corresponds with excellent brightness retention under bending, as illustrated in FIG. 5b. While actual maximum (or peak to valley) OPD may occur anywhere in the respective cube, examination of these Figures indicates that maximum OPD generally occurs in comparing the optical path at the base with the optical path at the peak. However, in some neutral axis constructions where the cube is positioned nearly optimally, the maximum OPD may actually be associated with an intermediate point relative to the peak.

Figure 7:
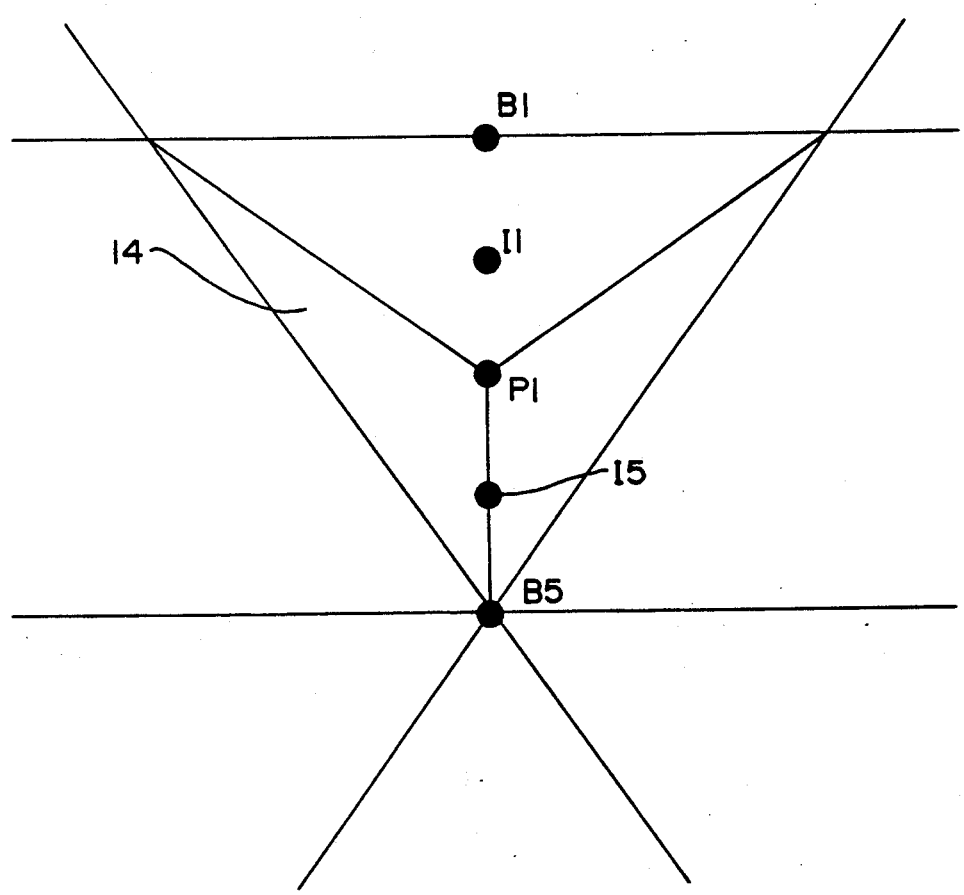
FIG. 7 is a plan view of a ray diagram of entrance and exit positions used for optical path calculation in conventional cube construction neutral axis sheeting.

Using the above understandings, it is possible to assess the quality of the optical performance of arbitrary constructions. Optical path difference for arbitrary constructions is estimated by comparing the optical paths for selected rays tracing paths through the cube corner element. FIG. 7 illustrates the ray entrance and exit positions used for three different rays traveling through cube corner element 14 in a neutral axis sheet. In FIG. 7, B1 is the base ray entrance location, and B5 is the base ray exit location; I1 is the intermediate ray entrance location, and I5 is the intermediate ray exit location, P1 represents both the peak ray entrance and exit locations.

Figure 8:
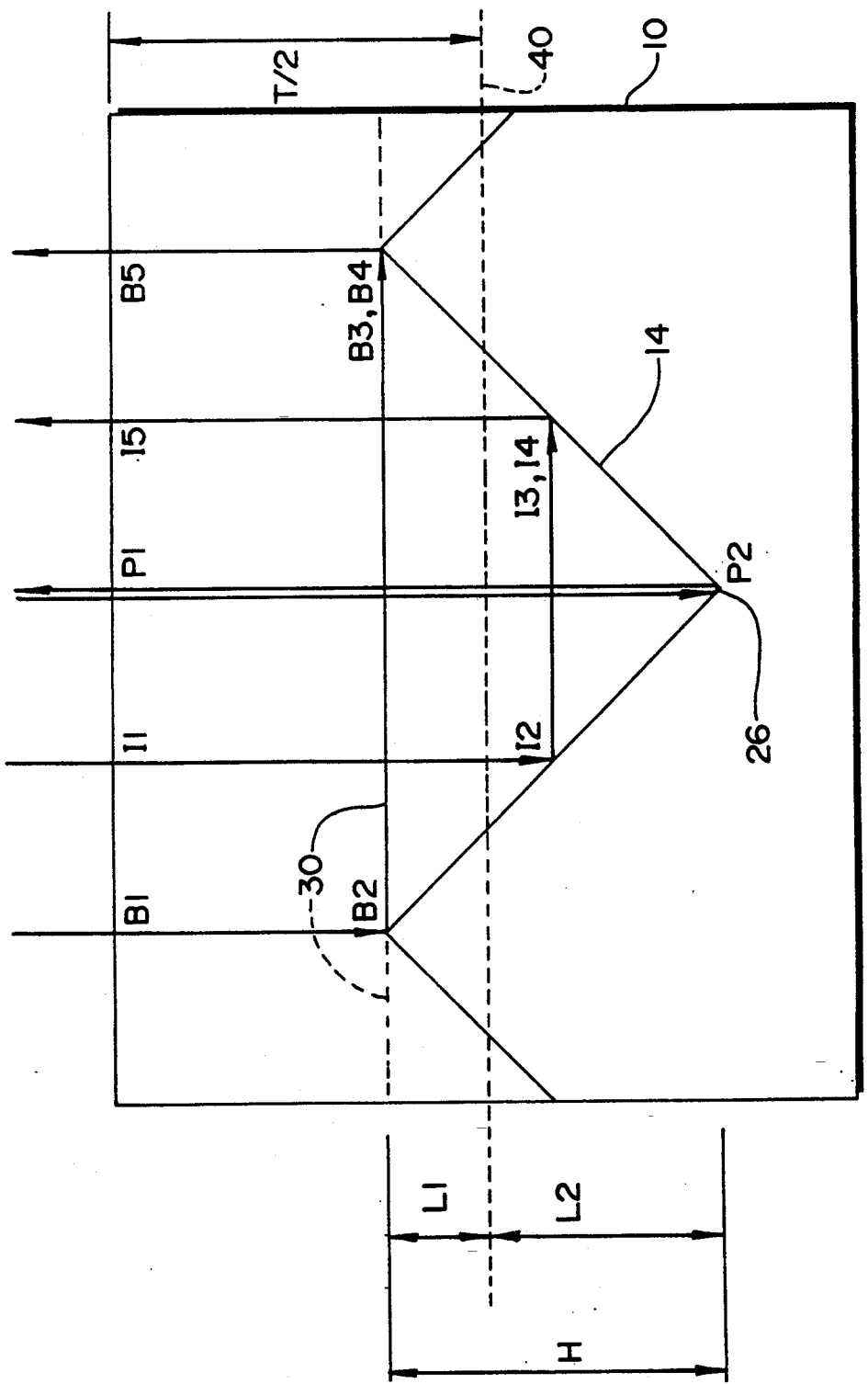
FIG. 8 is a ray diagram of optical path calculation in conventional cube construction neutral axis sheeting, with base and peak reversed relative to FIGS. 2 and 3.

Although the path of the rays shown in FIG. 7 may be determined by a knowledge of cube corner geometry and optics, FIG. 8 is provided to clarify one of the methods useful for determining the ray path values enabling OPD predictions. A useful approximation of peak-to-valley optical path difference for a cube construction is the greater of the OPD (base to peak), the OPD (intermediate to peak), and the OPD (intermediate to base). In FIG. 8, B1-B2-B3-B4-B5 illustrates the ray path of a base ray; I1-I2-I3-I4-I5 illustrates the ray path for an intermediate ray; and P1-P2-P1 illustrates the ray path for a peak ray. In the limiting case of the ray at the peak, all three cube face intersections are substantially coincident. Although cube corner element 14 in FIG. 8 is depicted across neutral bending axis 40, such location is not relevant to the calculation of OPD. Calculation of optical path values may therefore be accomplished as follows:

Optical path base = $N \times (B1B2 + B2B3 + B4B5)$

Optical path intermediate = $N \times (I1I2 + I2I3 + I4I5)$

Optical path peak = $2 \times N \times P1P2$.

wherein N = refractive index. It is recognized that OPD units may be converted to units of waves by dividing by the value of the wavelength, Predicted normalized strain energy density and peak to valley optical path differences were calculated for 96 different neutral axis constructions and applied bending loads. Truncated cube corner prismatic elements were utilized with cube heights of 0.0635 mm (2.5 mils), 0.0889 mm (3.5 mils), and 0.1778 mm (7 mils). Position of the cubes relative to a neutral bending axis, such as depicted by neutral bending axis 40, were also varied, with $K_1$ values of 3, 2, 1, 0.5, 0.25, 0, $-1$, and $-2$ being utilized. Bending loads of 7.62, 25.4, 76.2, and 254 millimeters (0.3, 1, 3, and 10 inch) radii of curvature were analyzed for all constructions. Predicted peak to valley optical path difference was plotted against normalized strain energy density in FIG. 9 (for several cube configurations) and FIG. 10 (for 55-55 cubes). The FIG. 9 cube geometries include 55-55, 60-60, and 65-65, shown as lines 82, 84, and 86, respectively. FIG. 10 separates the data for 55-55 cubes and uses linear regression to quantify the relation between peak to valley OPD and normalized strain energy density. The regression line is depicted as line 88.

Figure 9:
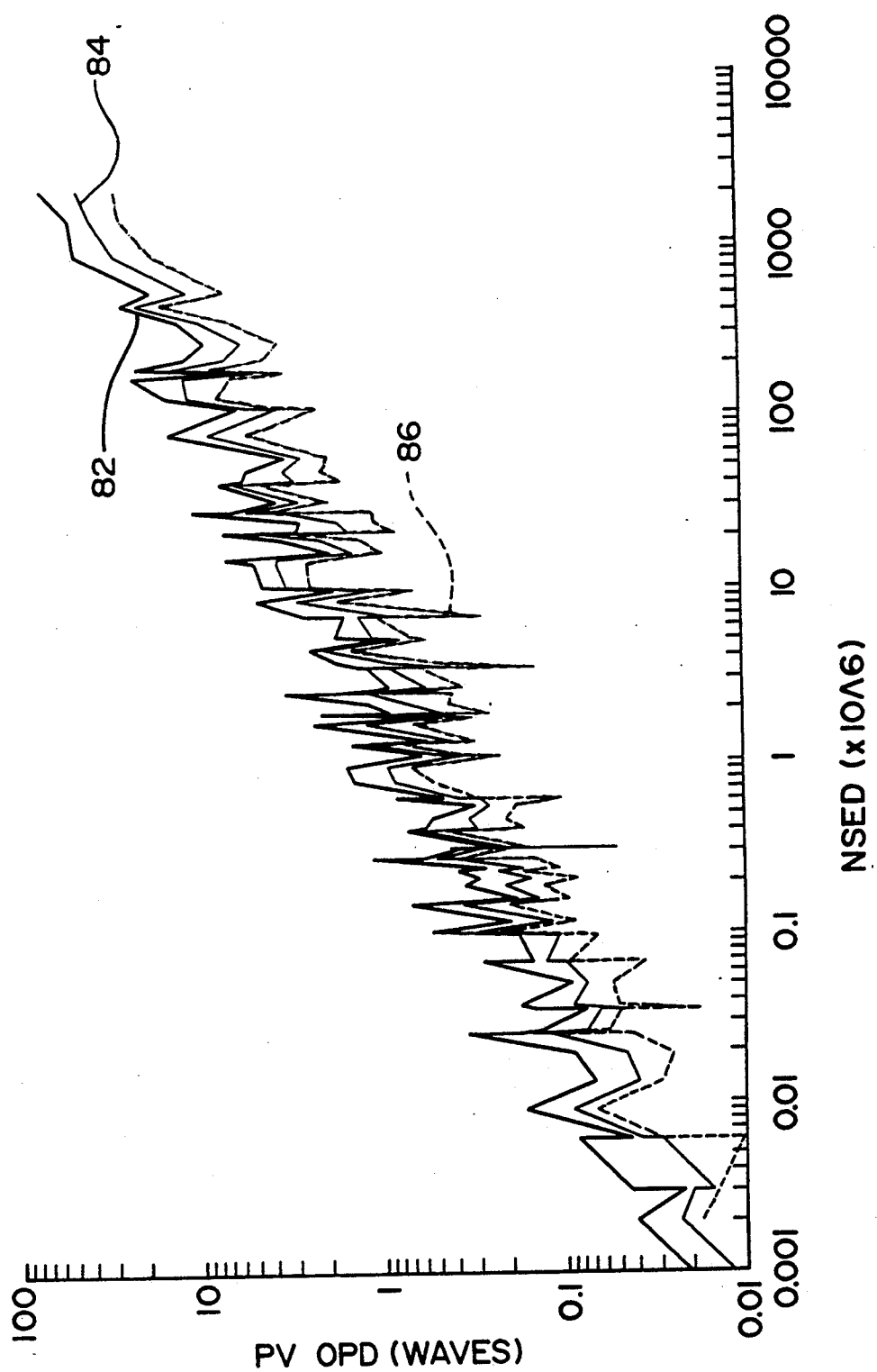
FIG. 9 is a plot of predicted peak to valley optical path difference versus normalized strain energy density.
Figure 10:
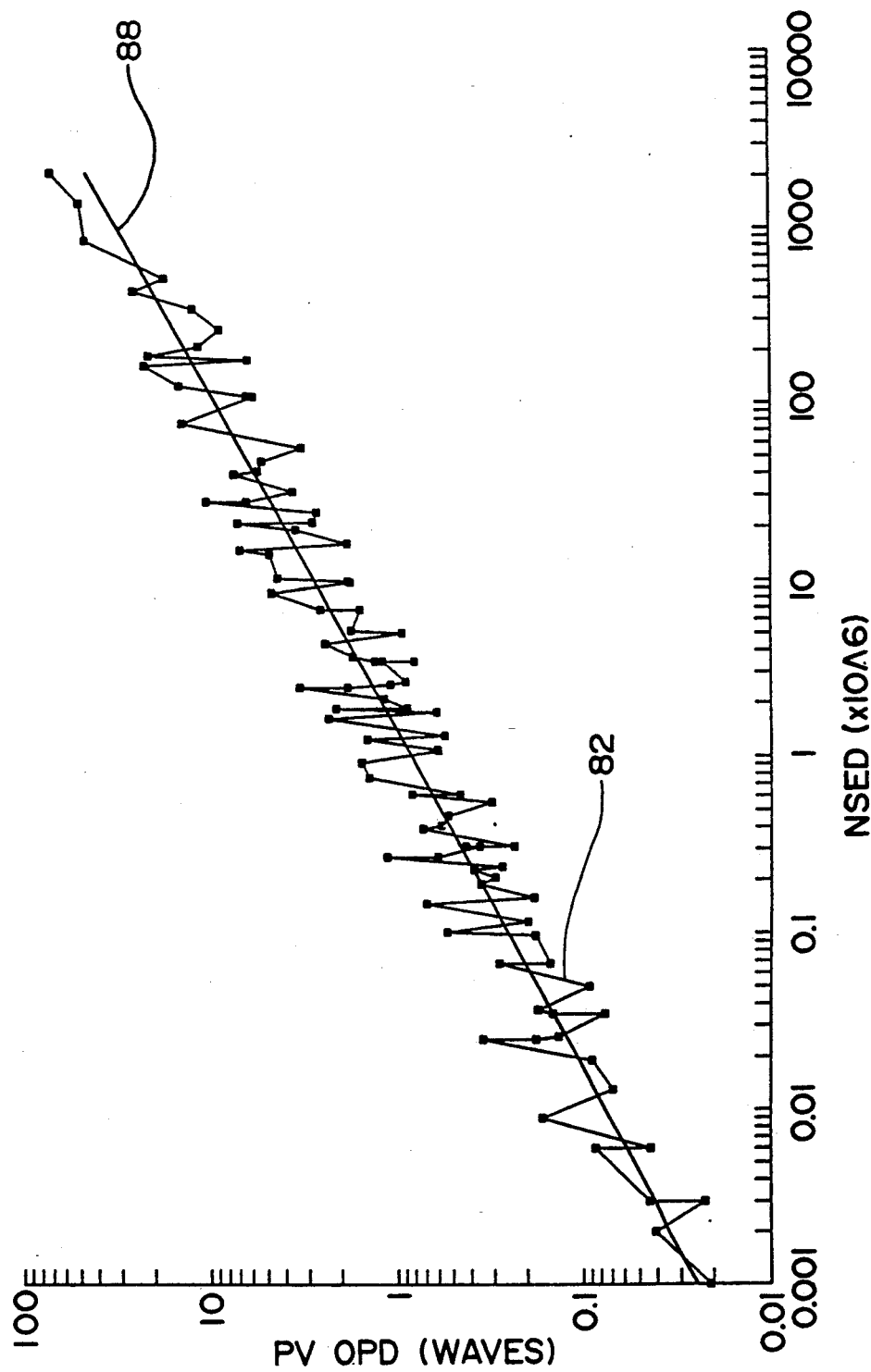
FIG. 10 is a plot of the peak to valley optical path difference versus normalized strain energy density for both predicted and regression analysis data for 55-55-70 geometry cubes.
Figure 11:
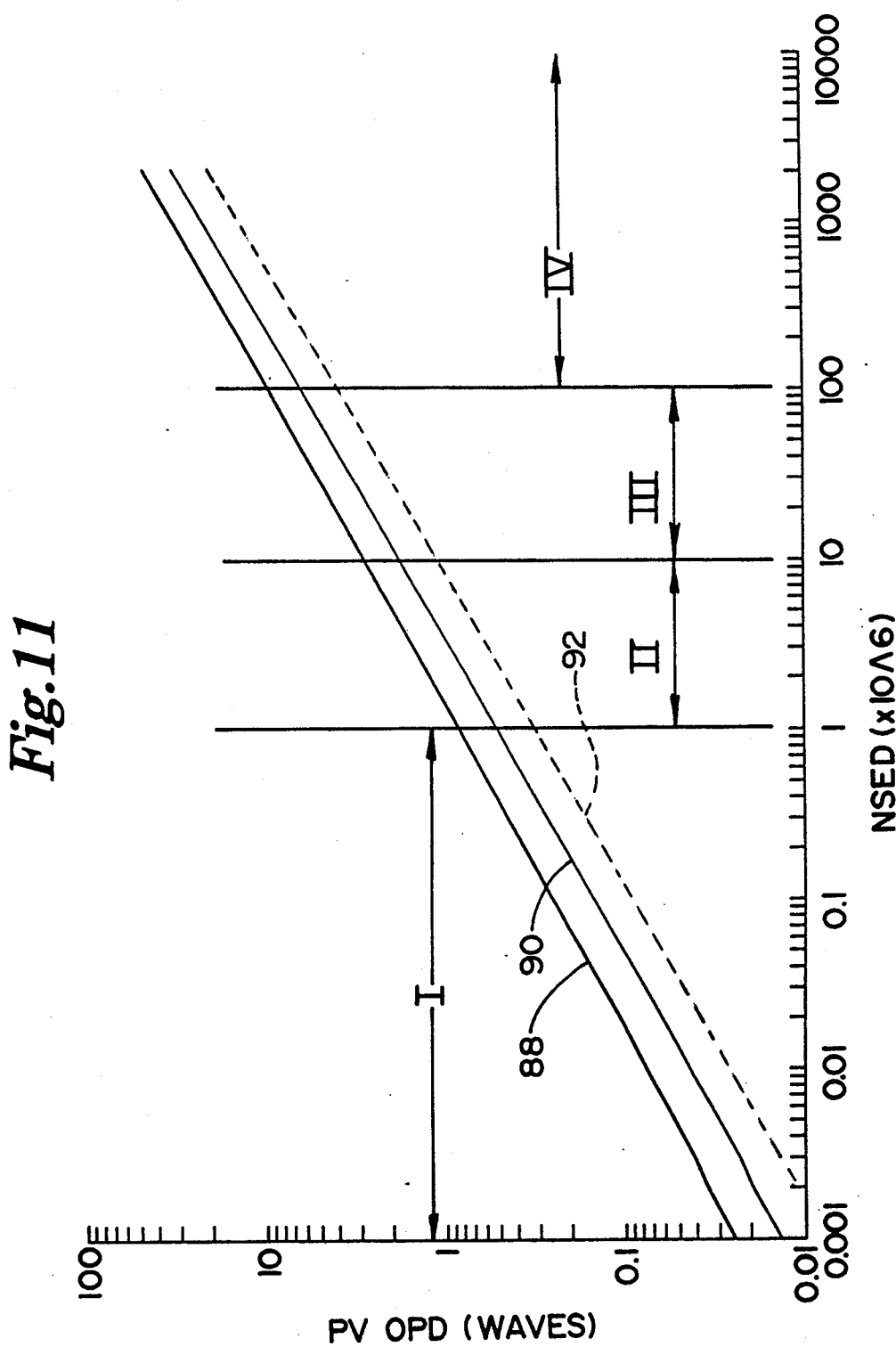
FIG. 11 is a plot of the peak to valley optical path difference versus normalized strain energy density regression predictions for 55-55-70, 60-60-60, and 65-65-50 geometry cubes.

FIG. 11 reproduces the data from FIG. 9, but shows only regression lines 88, 90, 92 for data of the three cube geometries shown as lines 82, 84, and 86. Experimental data, highlighted in FIGS. 5a-5c and 6a-6c, shows that peak to valley OPD less than about 1 wave results in minimal optical performance degradation, while peak to valley OPD greater than about 5 waves results in severe degradation. These experimental limits of peak to valley optical path difference, combined with the correlations presented in FIG. 11, can be used to establish limits on NSED. Very minimal degradation in optical performance is expected for normalized strain energy densities below approximately $1 \times 10^{-6}$, as depicted by region I. Between $1 \times 10^{-6}$ and $1 \times 10^{-5}$ some optical degradation is expected, particularly at small observation angles, as depicted by region II. Substantial degradation is expected for NSED values between $1 \times 10^{-5}$ and $1 \times 10^{-4}$, shown as region III. For strain energy densities above $1 \times 10^{-4}$, severe degradation in retroreflected light is predicted, as shown at region IV. It is also recognized that, for a given NSED, some cube geometries will produce different, for example, lower, peak to valley OPD. The effect of this is to possibly alter the specific NSED limits although the slope of the regression curves is independent of cube base geometries, and the principles of the invention remain intact and applicable to other constructions.

Figure 12:
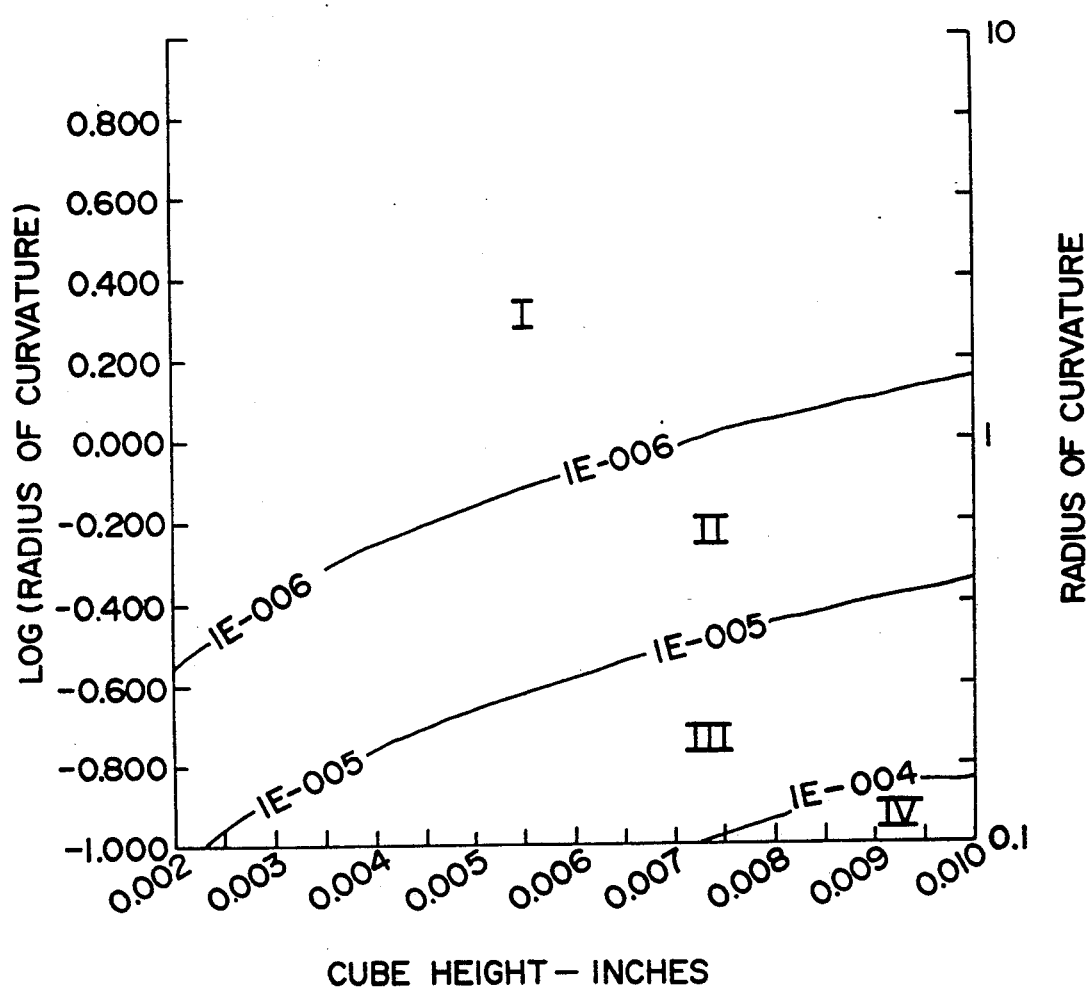
FIG. 12 is a plot of expected optical performance for different cube heights and radii of curvature for cubes optimally positioned relative to a sheet neutral axis.

These general limits can be used in conjunction with the above U" equations to predict the optical response surfaces for arbitrary neutral axis constructions. Sample response surfaces are presented in FIGS. 12 and 13. In particular, FIG. 12 shows the strain energy response surface for cubes positioned at the location of minimum normalized strain energy density. In this case, $K_1$ is fixed and equal to 0.25. Therefore, minimum strain energy becomes a function of only radius of curvature and cube height, $K_2$.

Figure 13:
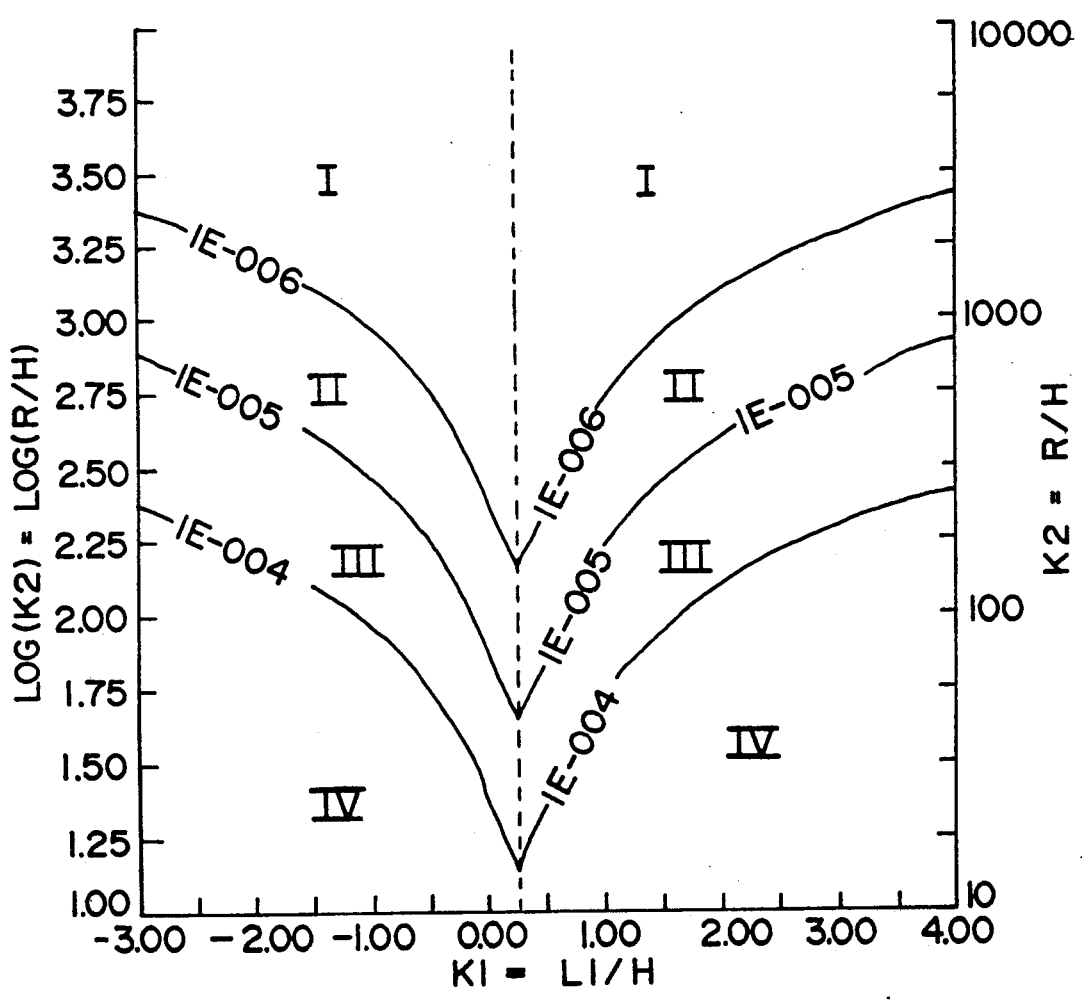
FIG. 13 is a plot of expected optical performance for different cube heights, radii of curvature, and positions relative to a sheet neutral axis.

For cubes not optimally positioned, a full response surface as a function of both $K_1$ and $K_2$ is presented in FIG. 13 as zones of normalized strain energy density corresponding with changes in optical performance. FIG. 13 discloses the tradeoff in optical performance as a function of applied load and sheeting construction. However, the line at 0.25 corresponds to FIG. 12 and optimal positioning of a cube relative to a bending axis.

The model used to generate FIGS. 12 and 13 may also be useful to analyze and summarize the expected strain energies for arbitrary constructions, particularly in view of the correlations disclosed herein. The cubes in such a model do not have to be placed at the minimum strain energy density location. Cube height, cube position relative to the neutral axis, and radius of curvature (H, $L_1$, and R) can be used to determine $K_1$ and $K_2$. Expected strain energy density and therefore expected optical performance can be calculated for these geometries and loads.

The invention does not require the use of particular geometries of cube-corner elements. This invention comprises the first recognition of a correlation between a particular mechanical property and configuration of the materials used in the invention and the optical performance of the invention. Indeed, articles comprising virtually any prismatic retroreflective elements may be used if they are located within an article at the location relative to the neutral axis as described herein.

The specific results assume neutral axis constructions in sheets with isotropic material properties. However, the correlation between normalized strain energy density and optical performance may be applicable to the prediction of optical performance for a wider variety of constructions. Application of this concept to other constructions generally requires numerical (finite element) solutions for stress, strain and strain energy density. However, the concepts of the invention apply to retroreflective sheeting where the material properties are not the same above and below the cubes.

I claim:

1. A retroreflective cube corner element laminated sheet for bending applications, comprising:
   a) a sheet outer surface designed for tension during laminated sheet bending and a sheet inner surface designed for compression during laminated sheet bending;
   b) a neutral bending axis region located relative to the outer surface and the inner surface so that the neutral bending axis region comprises a neutral bending axis which is substantially free of stress and deformation during laminated sheet bending; and c) a plurality of reflective cube corner elements having surfaces purposefully located proximate the neutral bending axis to provide enhanced retroreflective performance for a given radius of curvature.

2. The retroreflective sheet of claim 1 in which:
a) each reflective cube comprises a cube base and a cube peak; and
b) the base of each reflective cube is located within a range of 0 to 0.0254 millimeter (1 mil) from the neutral bending axis.

3. The retroreflective sheet of claim 1 in which:
a) each reflective cube comprises a cube base and a cube peak; and
b) the base of each cube is located within a range of 0 to 0.0127 millimeter (0.5 mil) from the neutral bending axis.

4. The retroreflective sheet of claim 1 in which the cube surfaces are located to create minimum peak to valley optical path difference values.

5. The retroreflective sheet of claim 1 in which:
a) each reflective cube comprises a cube base and a cube peak; and
b) the cube base is located closer to the neutral bending axis than is the cube peak.

6. The retroreflective sheet of claim 1 in which:
a) each reflective cube comprises a cube base and a cube peak; and
b) the value of the ratio of the distances of the cube base to the neutral bending axis and the cube base to the cube peak is between 0 and 0.5.

7. The retroreflective sheet of claim 6 in which the value of the ratio is between 0.2 and 0.3.

8. A layered retroreflective cube corner element article for bending applications, comprising:
a) an article outer surface designed for tension during article bending and an article inner surface designed for compression during article bending;
b) a neutral bending axis region located relative to the outer surface and the inner surface so that the neutral bending axis region comprises a neutral bending axis which is substantially free of stress and deformation during article bending; and
c) a plurality of reflective cubes positioned between the outer surface and the inner surface, the cubes each having surfaces purposefully located proximate the neutral bending axis to reduce strain energy density on the reflective cubes and to enhance the optical performance of the article.

9. The retroreflective article of claim 8 in which the reflective cubes are positioned sufficiently close to the neutral bending axis to exhibit a normalized strain energy density value of less than about $1 \times 10^{-6}$.

10. The retroreflective article of claim 8 in which the reflective cubes are positioned sufficiently close to the neutral bending axis to exhibit a normalized strain energy density value of between about $1 \times 10^{-6}$ and $1 \times 10^{-5}$.

11. The retroreflective article of claim 8 in which:
a) each reflective cube comprises a cube base and a cube peak; and
b) the cube base is located closer to the neutral bending axis than is the cube peak.

12. The retroreflective article of claim 8 in which:
a) each reflective cube comprises a cube base and a cube peak; and
b) the value of the ratio of the distances of the cube base to the neutral bending axis and the cube base to the cube peak is between 0 and 0.5.

13. The retroreflective article of claim 12 in which the value of the ratio is between 0.2 and 0.3.

14. The retroreflective article of claim 8 in which:
a) each reflective cube comprises a cube base and a cube peak; and
b) the base of each reflective cube is located within a range of 0 to 0.0254 millimeter (1 mil) from the neutral bending axis.

15. The retroreflective article of claim 8 in which:
a) each reflective cube comprises a cube base and a cube peak; and
b) the base of each cube is located within a range of 0 to 0.0127 millimeter (0.5 mil) from the neutral bending axis.

16. A method of manufacturing a retroreflective cube corner element laminated sheet for bending applications, comprising the steps of:
a) providing a sheet with an outer surface designed for tension during laminated sheet bending and a sheet inner surface designed for compression during laminated sheet bending; and,
b) positioning a plurality of reflective cubes within the sheet, each cube having a cube base and a cube peak; the plurality of cubes being positioned intentionally proximate to a neutral bending axis of the sheet to create optimal retroreflective performance for a given radius of curvature.

17. The method according to claim 16 in which the base of each reflective cube is positioned within a range of 0 to 0.0254 millimeter (1.0 mil) from the neutral bending axis.

18. The method according to claim 16 in which the base of each reflective cube is positioned within a range of 0 to 0.0127 millimeter (0.5 mil) from the neutral bending axis.

19. The method according to claim 16 in which the reflective cubes are positioned sufficiently close to the neutral bending axis to exhibit a normalized strain energy density value of less than about $1 \times 10^{-6}$.

20. The method according to claim 17 in which the reflective cubes are positioned sufficiently close to the neutral bending axis to exhibit a normalized strain energy density value of between about $1 \times 10^{-6}$ and $1 \times 10^{-5}$.

* * * * *